United States Patent [19]

Fullager

[11] 4,168,626
[45] Sep. 25, 1979

[54] TEMPERATURE PROBES

[75] Inventor: Harry Fullager, Emsworth, England

[73] Assignee: Rosemount Engineering Company Limited, United Kingdom

[21] Appl. No.: 884,170

[22] Filed: Mar. 7, 1978

[30] Foreign Application Priority Data

Mar. 15, 1977 [GB] United Kingdom ............ 10984/77

[51] Int. Cl.² ............................................. G01K 1/10
[52] U.S. Cl. ................................................ 73/343 R
[58] Field of Search .......... 73/362 AR, 339 R, 343 R; 338/28, 30; 136/232, 235; 174/74 R

[56] References Cited

U.S. PATENT DOCUMENTS

| 1,929,905 | 10/1933 | Slotsky | 174/77 |
| 2,533,462 | 12/1950 | Ingram | 73/362 AR |
| 2,838,935 | 6/1958 | DiCecio et al. | 73/362 AR |

FOREIGN PATENT DOCUMENTS

| 665870 | 1/1962 | United Kingdom . |
| 978899 | 12/1964 | United Kingdom . |
| 1214889 | 12/1970 | United Kingdom . |
| 1252754 | 11/1971 | United Kingdom . |
| 1277026 | 6/1972 | United Kingdom . |
| 1334550 | 10/1973 | United Kingdom . |

Primary Examiner—S. Clement Swisher
Attorney, Agent, or Firm—Nickolas E. Westman

[57] ABSTRACT

A temperature probe has a tubular sheath open at one end and a mounting body for mounting the probe in an operational location. The sheath is secured to the mounting body by means of a clamping member in screw-threaded engagement with the mounting body and trapping an olive encircling the sheath. The clamping member and mounting body are screwed together to compress the olive onto the sheath and form a fluid-tight seal between the sheath and the mounting body.

9 Claims, 2 Drawing Figures

TEMPERATURE PROBES

BACKGROUND OF THE INVENTION

The present invention relates to temperature probes. Typically such probes comprise an elongate tubular sheath which is closed at one end and open at the other. A temperature sensor such as a thermocouple or a resistance element, is provided in the sheath adjacent the closed end and has leads extending the length of the sheath for connecting the sensor to an external circuit. At the open end, the sheath is fastened to a mounting body which is adapted for securing the complete probe in an operational location, e.g. so that the probe can be screwed into a threaded aperture in a wall of an enclosure with the sheath extending into the enclosure. According to normal practice hitherto, the sheath is made of metal and is braised or welded in a bore extending through the mounting body to form a fluid-tight joint between the sheath and the body.

SUMMARY OF THE PRESENT INVENTION

According to one aspect of the present invention the temperature probe has a tubular sheath which is open at one end, a mounting body for mounting the probe in an operational location, a clamping member in screw-threaded engagement with the mounting body, and an olive encircling the sheath and trapped between the clamping member and the mounting body so as to be compressed onto the sheath to fasten the mounting body to the sheath providing a fluid-tight seal. Sealing olives are known for use in fastening connectors to lengths of piping, for example, in the plumbing arts. The use of an olive to fasten the mounting body to the sheath in the temperature probe of the present invention provides special advantages. The desired length of the sheath of a temperature probe, that is to say the length of the sheath between the closed end and the mounting body fastened to the sheath varies depending on the application of the probe.

Hitherto, it has proved necessary for manufacturers of temperature probes to offer for sale probes having a range of sheath lengths to suit different applications, even though other parameters of the probes might be substantially the same. The probe of the present invention has the advantage that it can be assembled from constituent parts with the use of only relatively simple hand tools. It will be appreciated that the previous practice of welding or braising the mounting body to the sheath requires both specialist equipment and skill. Conversely, the temperature probe of the present invention can be assembled by the purchaser or user with the use only of such simple hand tools as may commonly be found in a small workshop. Therefore, with the present invention, it is possible to offer for sale a kit for assembling a temperature probe comprising all the requisite parts but including for the tubular sheath of the probe a standard length of tube. If the standard length is at least as great as the greatest sheath length normally required by the purchaser or user then the length of tube supplied can be cut by the purchaser to provide a sheath length in accordance with his own requirements. Having cut the sheath to length to complete probe can readily be assembled.

In accordance with the second aspect of the present invention, a kit of parts for assembling a temperature probe includes a tubular sheath which is open at one end, a mounting body for mounting the probe in an operational location, a clamping member which is screw-threadedly engageable with the mounting body and an olive to fit around the sheath, the clamping member and the mounting member being arranged such that, when in screw-threaded engagement, they can trap the olive between them with the olive encircling the sheath and that, on being screwed together, they can compress the olive onto the sheath to fasten the mounting body to the sheath providing a fluid-tight seal.

Preferably, in the assembled temperature probe, the end face of the open end of the sheath bears against or is spaced from an abutment formed by one of the mounting body and the clamping member. In this way, the mounting body in unison with the clamping member is positively restrained from sliding by more than said spacing from the abutment along the sheath towards the closed end thereof. When in an operational condition, the probe may be mounted with the sheath directed into a region of high pressure which could, in the absence of the above preferred feature, cause the probe to be pushed back through the mounting body.

Preferably, also, one of the mounting body and the clamping member extends co-axially off the sheath beyond the open end thereof and has a bore through it co-operating with the open end and for insertion through the bore of a temperature sensor into the sheath. With this construction, the temperature sensor can be inserted into the sheath so as to be positioned adjacent the closed end thereof after the mounting body has been fastened to the sheath.

Conveniently, the mounting body has a bore right through it accommodating a portion of the sheath and the clamping member comprises a plug screwed into a threaded portion of the bore. Then, the plug is conveniently provided with a keying formation for engagement by a complimentary key for screwing the plug into the bore during assembly of the probe.

DETAILED DESCRIPTION OF THE DRAWINGS

Figure 1:
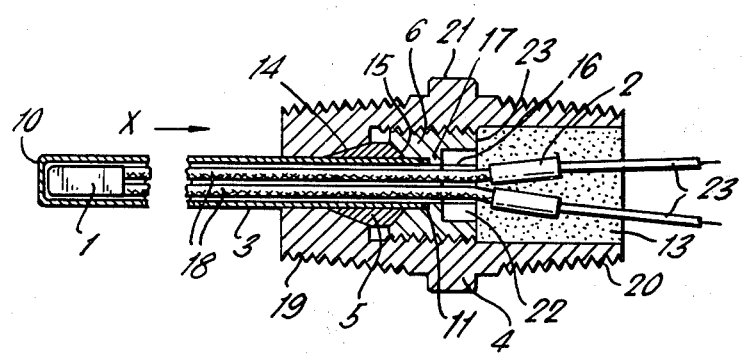
FIG. 1 is a longitudinal cross-section of an assembled probe forming an example of the present invention and FIG. 2 is a view of the probe of FIG. 1 from one end.
Figure 2:
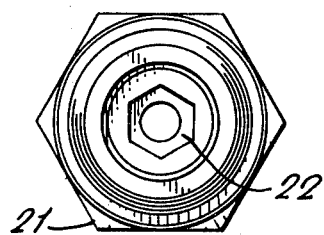

Referring to the drawings, the illustrated temperature probe is shown fully assembled but the constituent parts of the probe can readily be discerned. The probe comprises a sheath 3 which is formed of a length of metal tube closed at one end 10 and open at the other end 11. Typically, the sheath 3 is made of stainless steel. The probe further comprises a mounting body 4 and a plug 6 which may be screwed in a screw threaded portion 12 of a bore 13 which extends right through the body 4. Further, the probe comprises an olive 5 formed of a ring of relatively soft (non-resilient) deformable metal, e.g. copper, and sized to fit on the sheath 3. The body 4 and the plug 6 are formed with conical surfaces 14 and 15 respectively, designed to co-operate with corresponding conical surface portions on the outer surface of the olive 5. Thus, as illustrated in FIG. 1, the olive can be trapped between the surface 14 of the body 4 and the surface 15 of the plug 6 and compressed, by screwing the plug 6 into the threaded portion 12 of the bore 13 so that the olive is clamped around the sheath 3 both fastening the mounting body 4 to the sheath and forming a fluid-tight seal between the two. The body 4, plug 6 and olive or compressible ring 5 form a mounting body assembly for the sheath 3.

In the particular arrangement illustrated, the body 4 accommodates in the bore 13 a portion of the sheath 3 adjacent the open end 11. In the assembled probe, both the body 4 and the plug 6 extend beyond the open end 11 of the sheath and the plug 6 is provided with a bore 16 extending through it, substantially co-axial with the sheath 3 and having a minimum diameter approximately the same as the internal diameter of the sheath 3. However, as seen in FIG. 1, the bore 16 includes an annular shoulder 17 extending radially inwardly of the bore to provide a reduced diameter portion of the bore 16 having a diameter less than the external diameter of the sheath 3. The shoulder 17 provides an abutment for the end 11 of the sheath 3 which is located in the bore 16 and bears on the shoulder 17 so that the sheath 3 is postively prevented by the shoulder 17 from sliding backwards, i.e. in the direction of arrow x, relative to the mounting body 4. After assembly, the face of end 11 may be slightly spaced from the shoulder 17.

The temperature probe includes a temperature sensor device 1 located in sheath 3 adjacent the closed end 10. The sensor 1 may be a thermocouple or a resistance element. The sensor 1 has a pair of leads 18 extending from the sensor along the length of the sheath 3 and emerging from the open end 11 through the bore 16 in the plug 6.

The mounting body 4 may have any shape suitable for mounting the temperature in an operational location. In the illustrated example, the mounting body 4 has a pair of opposed tapered threads 19 and 20 on opposite sides of a hexagon 21. When mounting the assembled probe for operation, the tapered 19 is screwed into a correspondingly tapered threaded aperture provided in the wall of an enclosure so that the sheath 3 extends into the enclosure for sensing the temperature inside. The tapered thread 19 provides a good fluid seal between the body 4 and the wall of the enclosure.

It is proposed that the temperature probe described above be offered for sale as a kit of parts. In such a kit, the sheath 3 is provided having a length at least as great as the maximum length of sheath likely to be required by the purchaser or user. Then, before assembling the probe, the user himself cuts any surplus tube from the open end of the sheath until the sheath is the right length for his requirements. Then to assemble the probe, the open end of the probe is inserted into the bore 16 of the body 4. The olive 5 is also slipped onto the open end 11 of the sheath and the plug 6 is engaged with the internal threaded portion 12 of the bore 16. The plug 16 is provided with a key formation 22 on its outer surface 23, that is to say the surface remote from the conical surface 15. By engaging the key formation 22 with a complimentary shaped key, the plug 6 is screwed into the threaded portion 12 of the bore 16. In the example shown, the keying formation is a hexagonal recess for engagement by a hexagonally shaped socket wrench. As the plug 6 is screwed into the body 4 the end 11 of the sheath 3 is slightly space from the shoulder 17 in the plug 6. Firmly tightening the plug 6 in the body 4 causes the surfaces 14 and 15 to compress the olive 5 against the external surface of the sheath 3 fastening the body to the sheath and forming a fluid-tight seal. When the plug 6 is screwed home, the sensor 1 may be inserted through the bore 16 in the plug into the open end 11 of the sheath and along the sheath to the closed end 10. The leads 18 from the sensor 1 are connected to extension leads 23 extending from the bore 13 of the body 4 for connection to a utilisation circuit. The end portion of the bore 13 through which the leads 23 extend after emerging from the plug 16 may be filled with potting material so as to securely hold the leads and the sensor 1 in place.

I claim:

1. A temperature probe having a tubular sheath which is open at one end, a mounting body member for mounting the probe in an operational location, a clamping member in screw-threaded engagement with the mounting body member, and a non-resilient deformable metal olive shaped ring encircling the sheath and trapped between the clamping member and the mounting body member so as to be compressed onto the sheath to mechanically fasten the mounting body member to the sheath and provide a fluid-tight seal.

2. A temperature probe as claimed in claim 1, wherein one of the members includes means forming an abutment against which the end face of the open end of the sheath can bear.

3. A temperature probe as claimed in claim 2, wherein one of the members extends co-axially off the sheath beyond the open end thereof and has a bore through it aligning with the open end for insertion of a temperature sensor through the bore and into the sheath.

4. A temperature probe as claimed in claim 1, wherein the mounting body member has a bore through it accommodating a portion of the sheath and the clamping member comprises a plug screwed into a threaded portion of the bore.

5. A temperature probe as claimed in claim 4, wherein the plug is provided with a keying formation for engagement by a complimentary key for screwing the plug into the bore during assembly of the probe.

6. A temperature probe as claimed in claim 1, wherein the mounting body member has a pair of opposed tapered threads for securing the probe in a correspondingly tapered threaded aperture on the wall of an enclosure so that the sheath extends into the enclosure.

7. A temperature probe as claimed in claim 6 wherein the mounting body member includes a hexagon formation between the opposed tapered threads.

8. For use in combination with a temperature probe, including a tubular sheath having an open end, the improvement comprising a mounting body assembly for mounting the probe in an operational location, including a body member mounted on and encircling portions of said tubular sheath, a clamping member screw-threadedly engageable with the body member and a deformable metal ring of size to fit around the sheath between portions of the clamping member and the body member, said body member and clamping member being arranged such that, when in screw-threaded engagement, the ring is trapped between them with the ring encircling the sheath and that, on being screwed together, the ring is deformably compressed onto the sheath to fasten the mounting body assembly to the sheath and to provide a fluid-tight seal around the outer surface of the sheath.

9. A temperature probe having a tubular sheath which is open at one end, a mounting body for mounting the probe in an operational location, the mounting body having a through bore of size to receive a portion of the sheath adjacent its open end, and said bore having a threaded portion, a clamping plug scrwed into the threaded portion of the bore in the mounting body and completely within the bore, and a compressible ring encircling the sheath and positioned between the clamping plug and the mounting body, the plug and mounting body including surfaces engaging the ring so as to compress the ring onto the sheath as the plug is screwed into the mounting body to fasten the mounting body to the sheath and to provide a fluid-tight seal between the ring and the sheath, both the mounting body and the plug extending, co-axially off the sheath beyond the open end thereof and the plug having a bore through it aligning with the open end of the sheath, whereby a temperature sensor can be inserted into the sheath through the bore in the plug when the mounting body, the ring and the plug are mounted on the sheath.

* * * * *